(12) United States Patent
Labelle

(10) Patent No.: US 7,573,602 B2
(45) Date of Patent: Aug. 11, 2009

(54) METHOD AND DEVICE FOR OPTIMIZING THE SIZE OF A DIGITAL DOCUMENT

(75) Inventor: Lilian Labelle, St. Pierre de Plesguen (FR)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 11/028,304

(22) Filed: Jan. 4, 2005

(65) Prior Publication Data

US 2005/0149866 A1 Jul. 7, 2005

(30) Foreign Application Priority Data

Jan. 5, 2004 (FR) ................................. 04 00025

(51) Int. Cl.
*H04N 1/387* (2006.01)
*G06K 15/02* (2006.01)
*G06K 9/32* (2006.01)

(52) U.S. Cl. ..................... 358/1.2; 382/298; 382/294; 358/451

(58) Field of Classification Search ................ 715/525, 715/517; 382/294, 298, 290, 289, 293; 358/1.2, 358/1.6, 1.17, 1.16, 530, 538, 448, 449, 471, 358/450, 451

See application file for complete search history.

(56) References Cited

U.S. PATENT DOCUMENTS

2002/0075332 A1* 6/2002 Geilfuss et al. ............. 345/859
2003/0202699 A1 10/2003 Simard et al. ............... 382/195
2004/0035921 A1* 2/2004 Shioda et al. ............... 235/375
2004/0148574 A1* 7/2004 Ohtani et al. ............... 715/525
2005/0034068 A1* 2/2005 Jaeger ....................... 715/517
2006/0187482 A1* 8/2006 Ochiai et al. ............... 358/1.15

FOREIGN PATENT DOCUMENTS

EP 1 388 815 A2 11/2004
JP 2003-348360 A 12/2003

OTHER PUBLICATIONS

Inglis, S.J., et al., "Bi-level Document Image Compression using Layout Information", Data Compression Conference, 1996, DCC '96, Proceedings Snowbird, UT, USA, Mar. 31-Apr. 3, 1996, Los Alamitos, CA, USA, IEEE Computer Science, US, Mar. 31, 1996, p. 442.

* cited by examiner

*Primary Examiner*—Jerome Grant, II
(74) *Attorney, Agent, or Firm*—Fitzpatrick, Cella, Harper & Scinto

(57) ABSTRACT

The present invention is directed to optimizing the size of a digital document by using a content criterion such as size, resolution and the number of bits per pixel. A plurality of spatial zones are chosen according to a chosen geometric relation and the content criterion is ascribed to at least one of the zones. Modification of a size of a document is performed until a maximization of the quality or result is achieved.

17 Claims, 7 Drawing Sheets

METHOD AND DEVICE FOR OPTIMIZING THE SIZE OF A DIGITAL DOCUMENT

BACKGROUND OF THE INVENTION

The present invention concerns the optimization of the size of a digital document.

Data processing has become an essential tool for creating, archiving and transmitting digital documents during the past few years. Used for business purposes for a long time, data processing has today become an essential means for recovering information throughout the entire world or distributing personal digital contents.

Thus many products are currently available on the market for enabling digital contents to be generated. Some are dedicated to the general public through their simplified graphical interface and their reduced functionalities. Others, dedicated to a more professional market, make it possible to generate more advanced contents which are sometimes referred to as composites.

A composite document means a document which in general contains a text part and one or more digital data parts. These data can for example be images, sound, sequences of animated images or graphics.

When a user creates a composite document, he usually commences by typing in a text and then including digital data. Next he optimizes the document so as to be able to transmit it as quickly as possible.

Once the document is created, the user may wish to broadcast it, that is to say to send it to a distant machine. Nevertheless, an inexperienced user can generate a large composite document, typically several kilobytes or even several megabytes, and send it to a friend by means of the Internet.

The problem of time transfer of a document is posed in particular if this user has a low-speed connection to the Internet. For example, with a theoretical 56 Kbit/second (7 kilobytes) modem connection, a document of 5 Mbytes is transferred in 11 minutes. Hence the need for the user to have an editing tool indicating to him the size of the document currently being edited. In this way, he can control the final size of the document.

Many tools for editing digital documents, making it possible to create composite documents, are already known. For example, the American company Adobe is developing an editing tool intended to create documents for sending over the Internet: "GoLive" www.adobe.com. Tutorials on Adobe GoLive available from:

> http://studio.adobe.com/learn/tips/
> index.html?product=golive.

This tool uses some of the functionalities of the image editor sold under the reference "Photoshop" (registered trade mark). "Photoshop" is a digital image editing software package which makes it possible to optimize an image for the purpose of sending it over the Internet. For this purpose, as soon as a user wishes to optimize an image, several degraded versions of the original image are offered to him. For each of these images, the software indicates the transfer time for the image for a low-rate Internet connection (28 Kb/s).

"GoLive" is an Internet site editing tool, that is to say a tool for creating pages in mark-up language. When a user wishes to insert an image in a page, "GoLive" uses the optimization functionality of "Photoshop", that is to say a graphical window appears and offers to the user several degraded versions of the image. The user chooses one of them and the software inserts this image in the page.

When the user wishes to insert a second image, he proceeds in the same way as before, but, when choosing the version of this image, he asks himself what the final size of his document will be. Usually he inserts a version of the image, saves the document, looks at the size of the final document, changes the version of one of the images if the size is too great and so on until the size of his final document is reasonable. If the document (in this case a page in mark-up language in our example) is composed of several images, the user must usually re-edit these operations several times so as to degrade the least important images on the page (logos for example), and favor those which carry the semantic information of the page.

Such an editing process has the drawback of being tedious for the user.

The present invention precisely remedies this drawback.

SUMMARY OF THE INVENTION

It relates to a method of optimizing the size of a digital document comprising at least two digital contents.

According to a general definition of the invention, the method comprises the following steps:

i) determining at least two distinct spatial zones connected to each other according to a chosen geometrical relationship;

ii) allocating each content to a zone;

iii) comparing the size of the document thus composed with a chosen size; and iv) in the event of a negative comparison, choosing at least one zone and modifying the quality of at least one content allocated to the said zone.

According to one embodiment, step iv) is repeated until a positive comparison is obtained.

According to another embodiment, the modification step is implemented for all the contents allocated to the zone thus chosen.

According to yet another embodiment, the method also comprises a step of selecting at least one content allocated to the zone thus chosen and the implementation of the step of modifying the content thus selected.

In practice, the quality of a content is chosen according to at least one criterion belonging to the group formed by the size, the resolution and the number of bits per pixel.

According to another characteristic, the geometrical relationship is defined according to at least one law of dividing the chosen document.

For example the division law is chosen by the user.

According to yet another characteristic, each digital content comprises digital data belonging to the group formed by images, sound, sequences of images, graphics, text or a combination of digital data.

In practice, the digital document is of the composite type.

Another object of the present invention is a device for optimizing the size of a digital document comprising at least two digital documents.

According to another aspect of the invention, the device comprises:

means for determining at least two distinct spatial zones connected to each other in accordance with a chosen geometrical relationship, means for allocating each content to a zone, means for comparing the size of the document thus composed with a chosen size, and means for, in the event of a negative comparison, choosing at least one zone and modifying the quality of at least one content allocated to the said zone.

In practice, the modification means are able to modify all the contents allocated to the zone thus chosen.

In a variant, the modification means are able to modify a content thus selected.

Another object of the present invention is an information medium which can be read by a computer system, possibly totally or partially removable, in particular a CD-ROM or magnetic medium, such as a hard disk or a floppy disk, or a transmissible medium, such as an electrical or optical signal, characterized in that it comprises instructions of a computer program enabling an optimization method as mentioned above to be implemented, when this program is loaded into and executed by a computer system.

Finally, an object of the present invention is a computer program stored on an information medium, said program comprising instructions for implementing an optimization method as mentioned above, when this program is loaded into and executed by a computer system.

BRIEF DESCRIPTION OF THE DRAWINGS

Other characteristics and advantages of the invention will emerge in the light of the following detailed description and the drawings, in which.

DETAILED DESCRIPTION OF THE INVENTION

Figure 1:
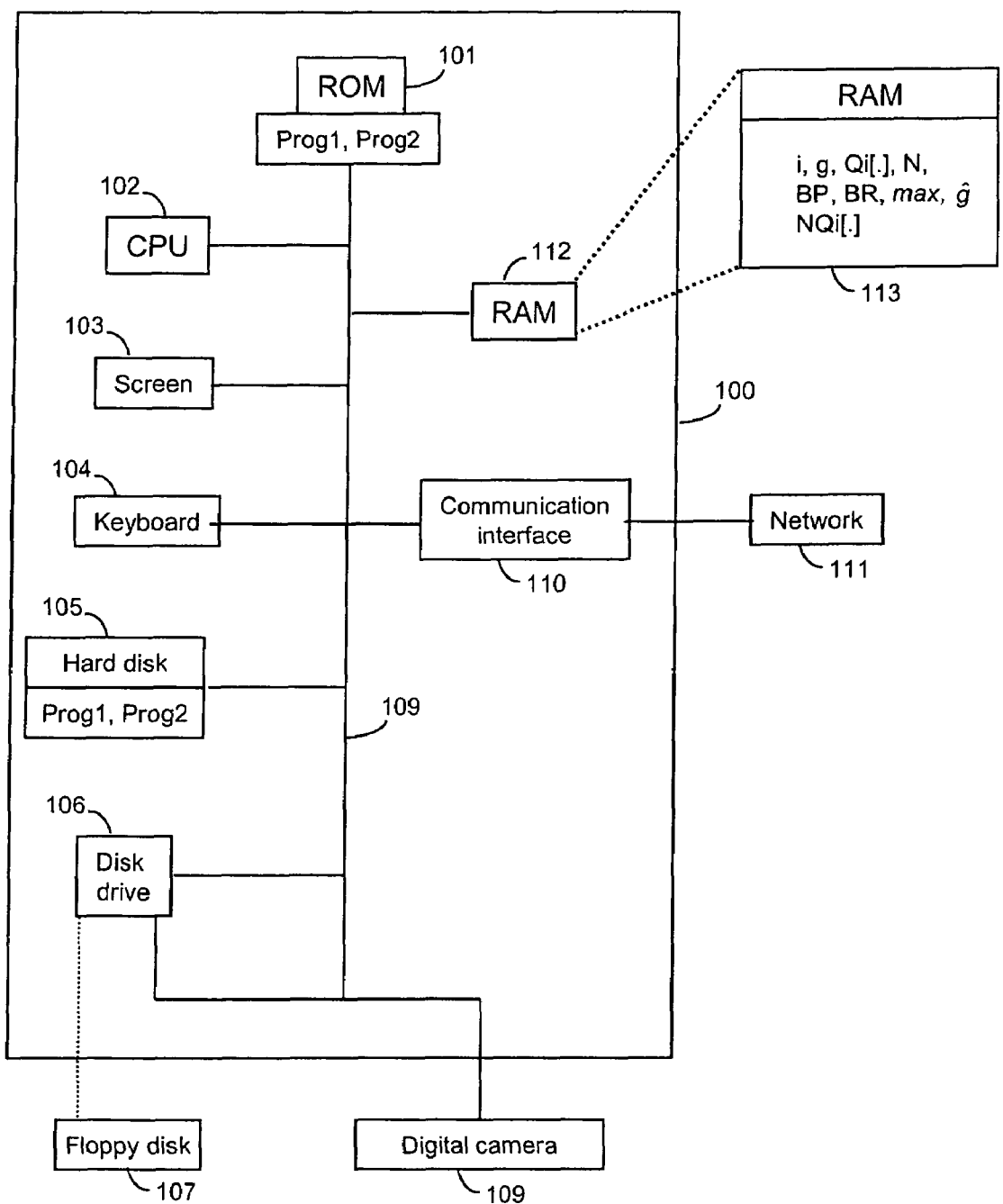
FIG. 1 depicts schematically the general architecture of a digital document editing device according to the invention.

With reference to FIG. 1, an apparatus implementing the invention is described, for example a microcomputer 100 or a workstation.

The apparatus 100 comprises a communication bus 109 to which there are connected:
- a central processing unit 102 (microprocessor) which controls the exchanges between the various elements of the apparatus,
- a read only memory 101 able to contain the programs,
- a random access memory 112 containing registers 113 adapted to record variables and parameters created and modified during the execution of the programs, in particular the counters i, g, Qi[.], N, BP, BR, max, ĝ and NQi[.], which will be described in more detail with reference to the following figures,
- a screen 103 for displaying data and/or serving as a graphical interface with the user, who will be able to interact with the programs according to the invention, by means of a keyboard 104 or any other means such as a pointing device, not shown, such as for example a mouse or an optical pen,
- a hard disk 105 able to contain the aforementioned programs,
- a disk drive 106 able to receive a floppy disk 107 and to read or write thereon data processed or to be processed according to the invention, and
- a communication interface 110 connected to a communication network 111, for example the Internet, the interface being able to transmit and receive data.

In the case of audio data, the apparatus also comprises an input/output card connected to a microphone, neither of which is depicted.

The communication bus 109 affords communication and interoperability between the various elements included in the microcomputer 100 or connected to it. The representation of the bus is not limiting and, in particular, the central unit is able to communicate instructions to any element of the microcomputer 100 directly or by means of another element of the microcomputer 100.

The executable code of each program enabling the programmable apparatus to implement the processing processes according to the invention can be stored for example on the hard disk 105 or in read only memory 101.

According to a variant, the floppy disk 107 can contain data as well as the executable code of the aforementioned programs which, once read by the apparatus 100, will be stored on the hard disk 105.

In a second variant, the executable code of the programs can be received by means of the communication network 111, via the interface 110, in order to be stored in an identical fashion to that described previously.

The floppy disks can be replaced by any information medium such as, for example, a compact disk (CD-ROM) or a memory card. In general terms, an information storage means, which can be read by a computer or by a microprocessor, integrated or not into the apparatus, possibly removable, is adapted to store one or more programs whose execution enables the method according to the invention to be implemented.

In more general terms, the program or programs can be loaded into one of the storage means of the apparatus 100 before being executed.

The central unit 102 controls and directs the execution of the instructions or portions of software code of the program or programs according to the invention, instructions which are stored on the hard disk 105 or in the read only memory 101 or in the other aforementioned storage elements. On powering up, the program or programs which are stored in a non-volatile memory, for example the hard disk 105 or the ROM memory 101, are transferred into the random access memory RAM 112, which then contains the executable code of the program or programs according to the invention, as well as registers for storing the variables and parameters necessary for implementing the invention.

It should be noted that the communication apparatus comprising the device according to the invention can also be a programmed apparatus.

This apparatus then contains the code of the computer program or programs for example fixed in an application specific integrated circuit (ASIC).

Figure 2:
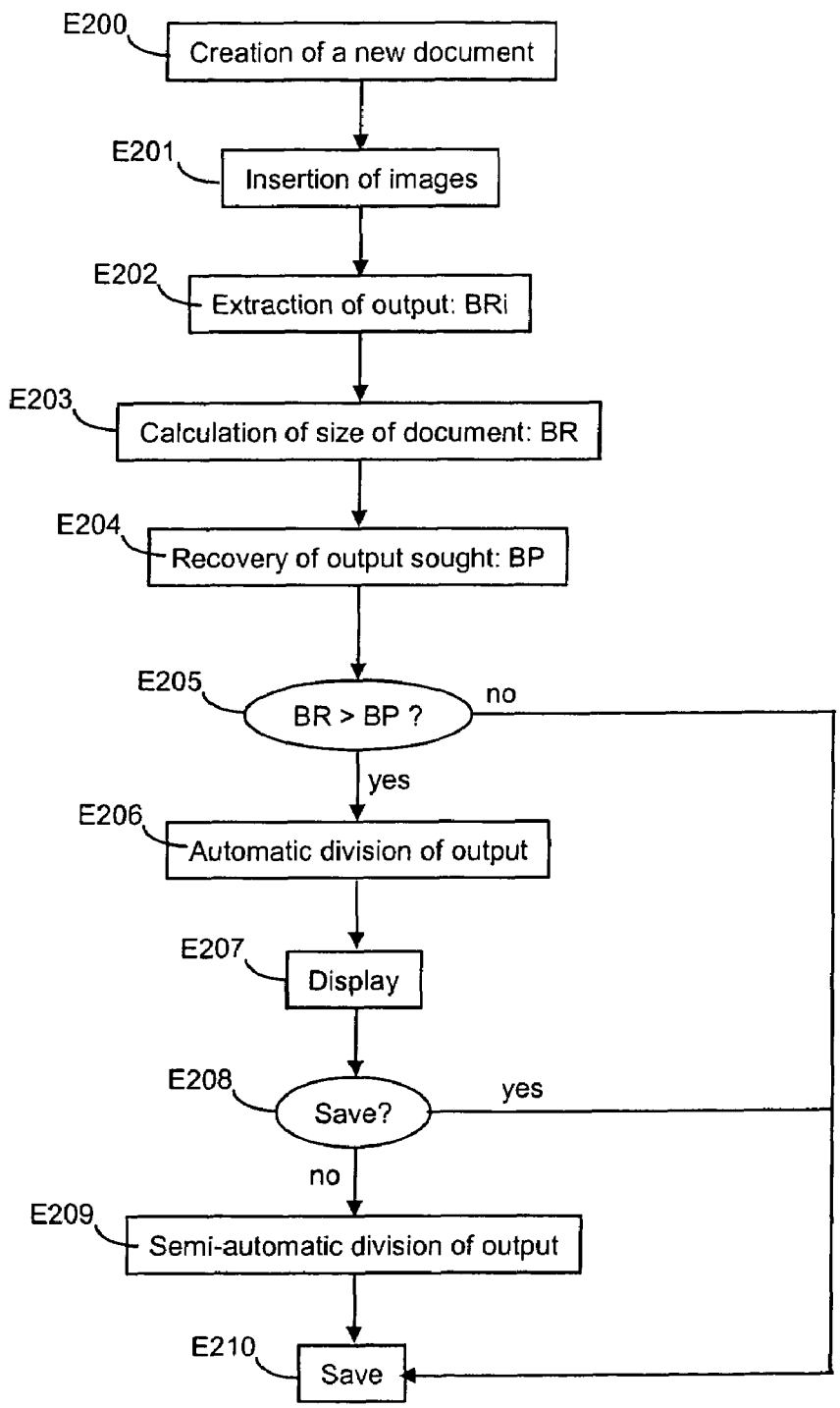
FIG. 2 illustrates the steps of the document creation method according to the invention.

With reference to FIG. 2, the method of creating a document according to the invention has been described.

The method commences with step E200, during which the user creates a new (blank) document from a graphical interface, using for example the keyboard 104, and the screen 103 of FIG. 1. Step E201 enables the user to insert and position images in the document. Step E201 is followed by step E202, which recovers the size $BR_i$ (or output) of the images included, expressed in bytes. Step E203 calculates the size of the document according to the equation:

$$BR = \Delta + \sum_{i=1}^{i} BR_i$$

with Δ a constant (fixed at 1 kilobyte) and I the number of images included.

Step E204 recovers the maximum size BP of the document (also referred to as the output sought). This value is fixed by the user by means, for example, of the keyboard 104 of FIG. 1. Step E204 is followed by step E205, which tests whether the size of the document is greater than the maximum size. If such is not the case, step E205 is followed by step E210, which saves the document. The method stops following this step. If the test of step E205 is positive, step E205 is followed by step E206, which creates a document which respects the maximum-size constraint described with reference to FIG. 3. Step E206 is followed by step E207, which supplies to the user a representation of the new document generated. Step E207 is followed by step E208, which asks the user whether he wishes to save this document. In the affirmative, step E208 is followed by the previously described step E210. In the negative, step E208 is followed by step E209, which creates a new document in a semi-automatic fashion as described with reference to FIG. 7. Step E209 is followed by the previously described step E210.

Figure 3:
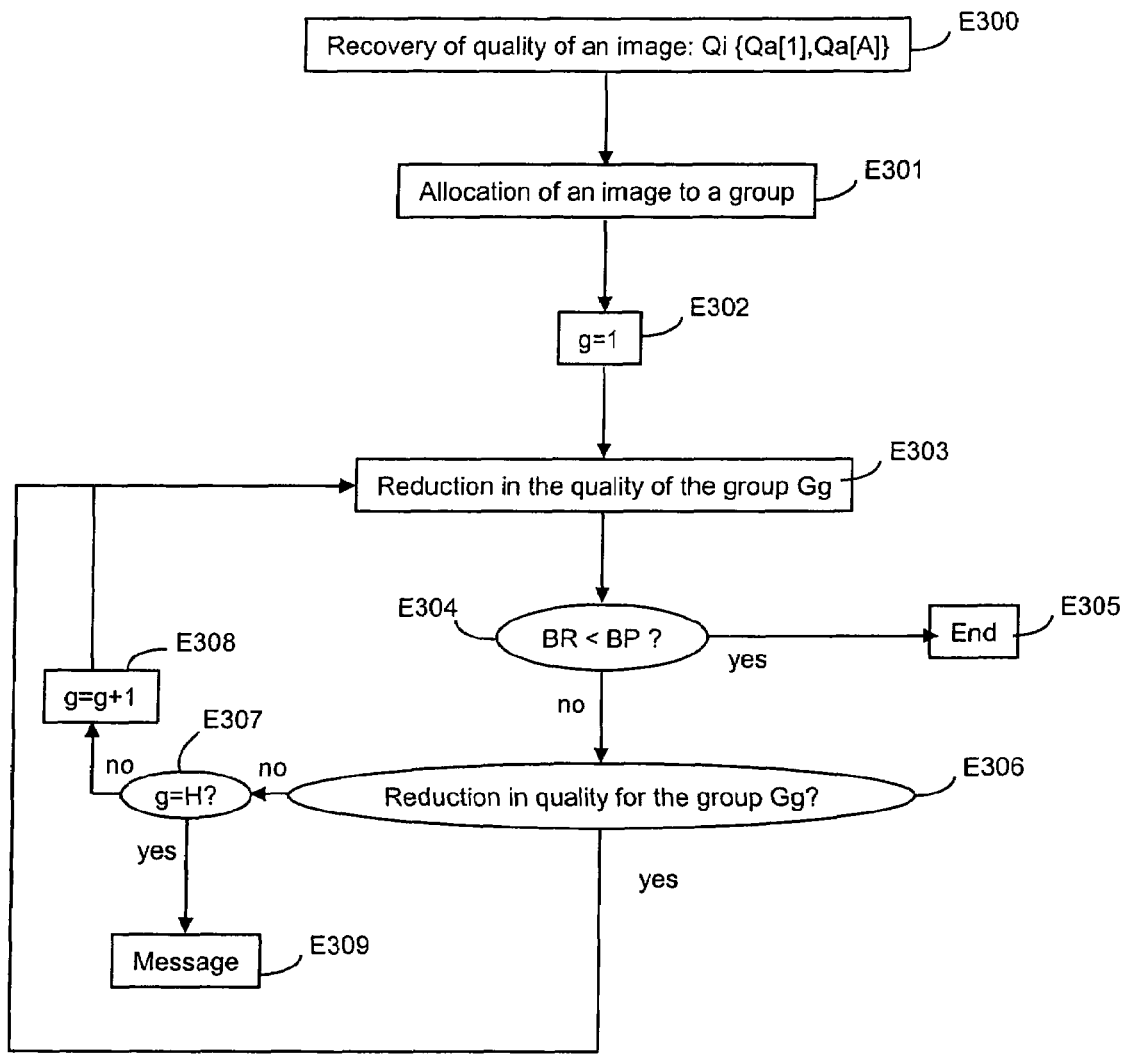
FIG. 3 illustrates the steps of the method of automatically creating a document whose size is less than the maximum size.

With reference to FIG. 3, the method of automatically creating the document whose size BR is less than the maximum size BP has been described.

Step E300 describes the qualities Qi of each of the images from the header of the image files. According to a preferred embodiment of the invention, each image is compressed with the JPG2000 algorithm. Because of this, from the image file, several images with various qualities (and the same spatial resolution) can be deduced. Because of this, with each image there are associated at least two qualities Qi and the images included in the document are the images with the maximum quality Qi[A]. Step E300 is followed by step E301, which allocates each image of the document to a group or zone according to the method described with reference to FIG. 4. Step E302 initializes a counter g on the number of groups. Step E302 is followed by step E303, which modifies the quality of each image of the current group Gg with reference to FIG. 6. Step E303 is followed by step E304, which tests whether the size of the new document BR is less than the maximum size BP. if such is the case, the method stops (step E305). In the contrary case, step E304 is followed by step E306, which tests whether it is possible once again to reduce the quality of at least one image in the current group Gg. In the affirmative, step E306 is followed by the previously described step E303. In the contrary case, step E306 is followed by step E307, which tests whether all the groups have been considered. In the affirmative (g=H), a message is sent to the user stating to him that the document cannot satisfy the maximum-size constraint. In the contrary case, step E307 is followed by step E308, which considers the following group. Step E308 is followed by the previously described step E303.

Figure 4:
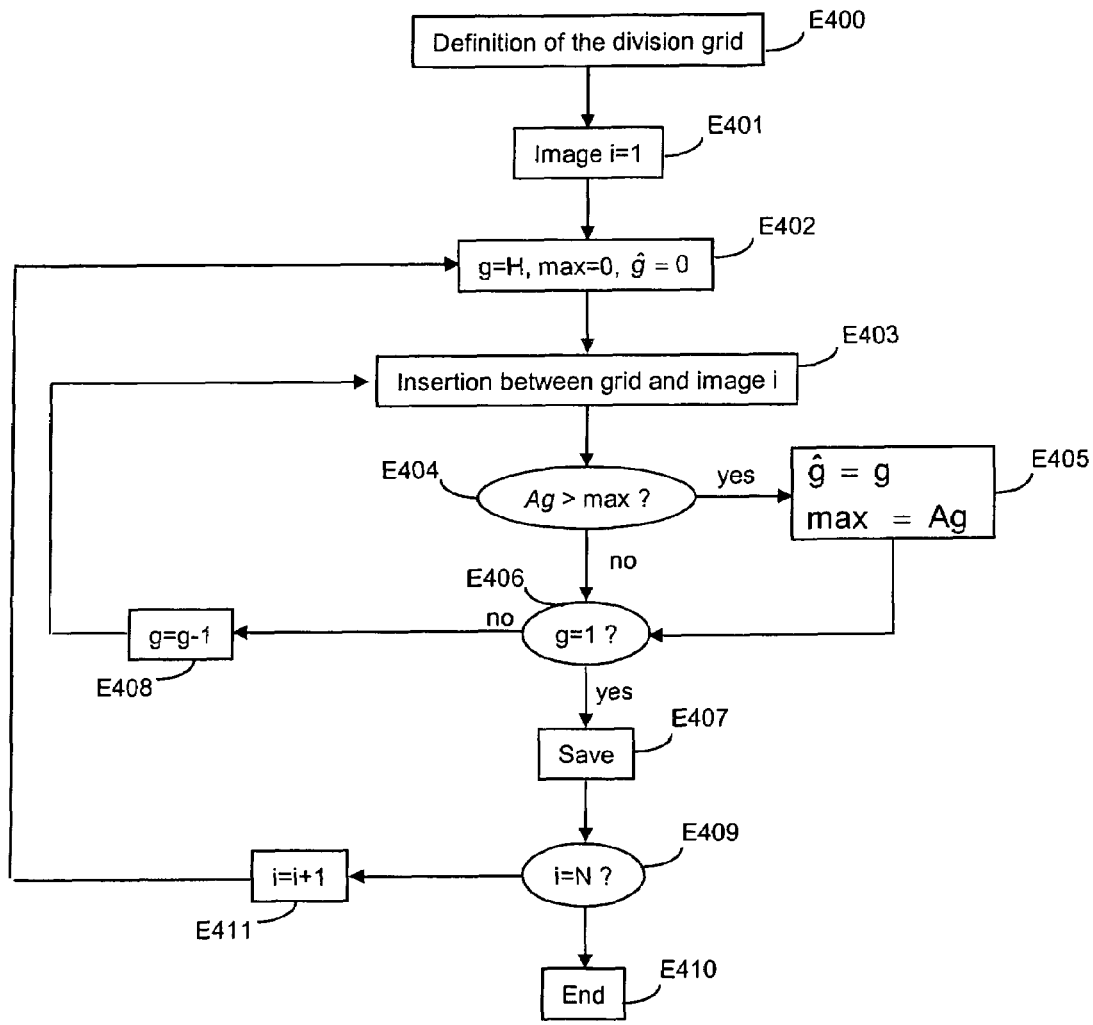
FIG. 4 illustrates the steps of the method of allocating an image to a zone according to the invention.

With reference to FIGS. 4 and 5, the method of allocating an image to a group or zone has been described.

Figure 5A:
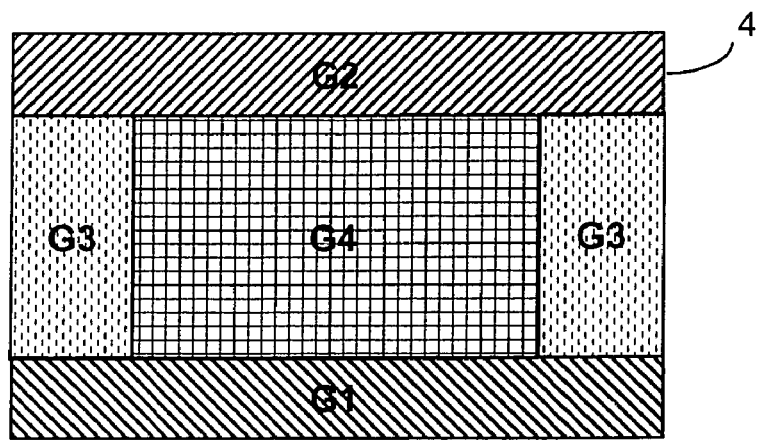
FIGS. 5a and 5b are examples of the allocation of an image to a zone according to the invention.

The method begins with step E400, which defines a division of the medium for each page of the document, in accordance with a chosen grid (or mask). According to a preferred embodiment, the division is equivalent for all the pages of the document. Nevertheless, it is possible to imagine specifying a different division for each of the pages without for all that modifying the content of the invention. An example of division is given by FIGS. 5a and 5b. The page of the document 4 is divided into 4 spatial zones referred to as groups G1, G2, G3, G4 (FIG. 5a). For example, information contained in a document is situated in the groups G3 and G4. Groups G1 and G2 often contain logos or the like. Thus, as described with reference to FIG. 3, the first step is to degrade the images in groups G1 and G2 before degrading the images in groups G3 and then G4.

The groups are defined by the user by means of one of the graphical means described with reference to FIG. 1.

Returning to FIG. 4, step E400 is followed by step E401, which initializes an image counter i. Step E402 initializes n group counters to H, the maximum number of groups (here 4), so as to consider the least important group (those situated on the edge of the pages) before the central groups. This step also initializes two variables max and □ to 0. Step E402 is followed by step E403, which calculates the intersection between the spatial area covered by the current image i and the current group g according to the following formula:

Ag=intersection between current image i and current group g/area of the image i

Figure 5B:
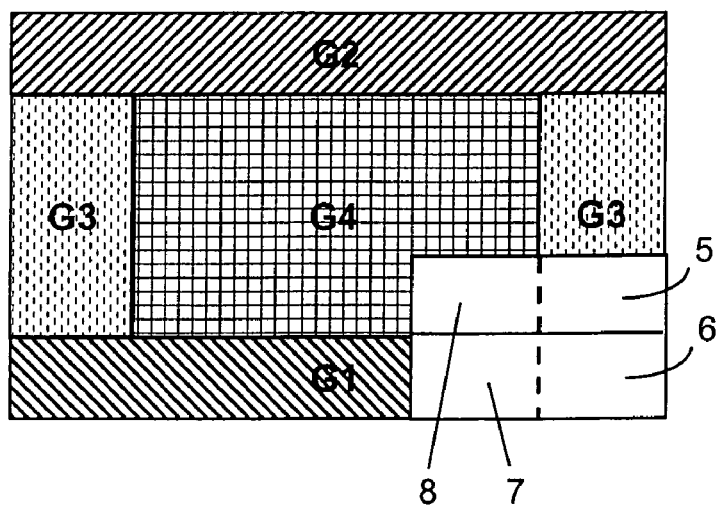

Step E403 is followed by step E404, which tests whether Ag is greater than the variable max. If such is the case, the number of the current group g is allocated to the variable ĝ and the value Ag is allocated to the variable max. Step E405 is followed by step E406. Where the test of step E404 is negative, step E404 is followed by step E406, which tests whether all the groups have been considered. If such is not the case, the following group is considered (step E408). Step E408 is followed by the previously described step E403. Where the test of step E406 is positive, this step is followed by step E407, which saves the values max and ĝ (associated with the image i). Step E407 is followed by step E409, which tests whether all the images have been considered. If such is the case the allocation process stops (Step E410). In the contrary case step E409 is followed by step E411, which considers the following image. Step E411 is followed by the previously described step E402. FIG. 5b gives an example of execution of the algorithm of FIG. 4. In this example, max 1 (group 1, zone reference 7 in FIG. 5b)=25%, max 3 (group 3, references 5 and 6 in FIG. 5b)=50%, max 4=25% and max 2=0.

Figure 6:
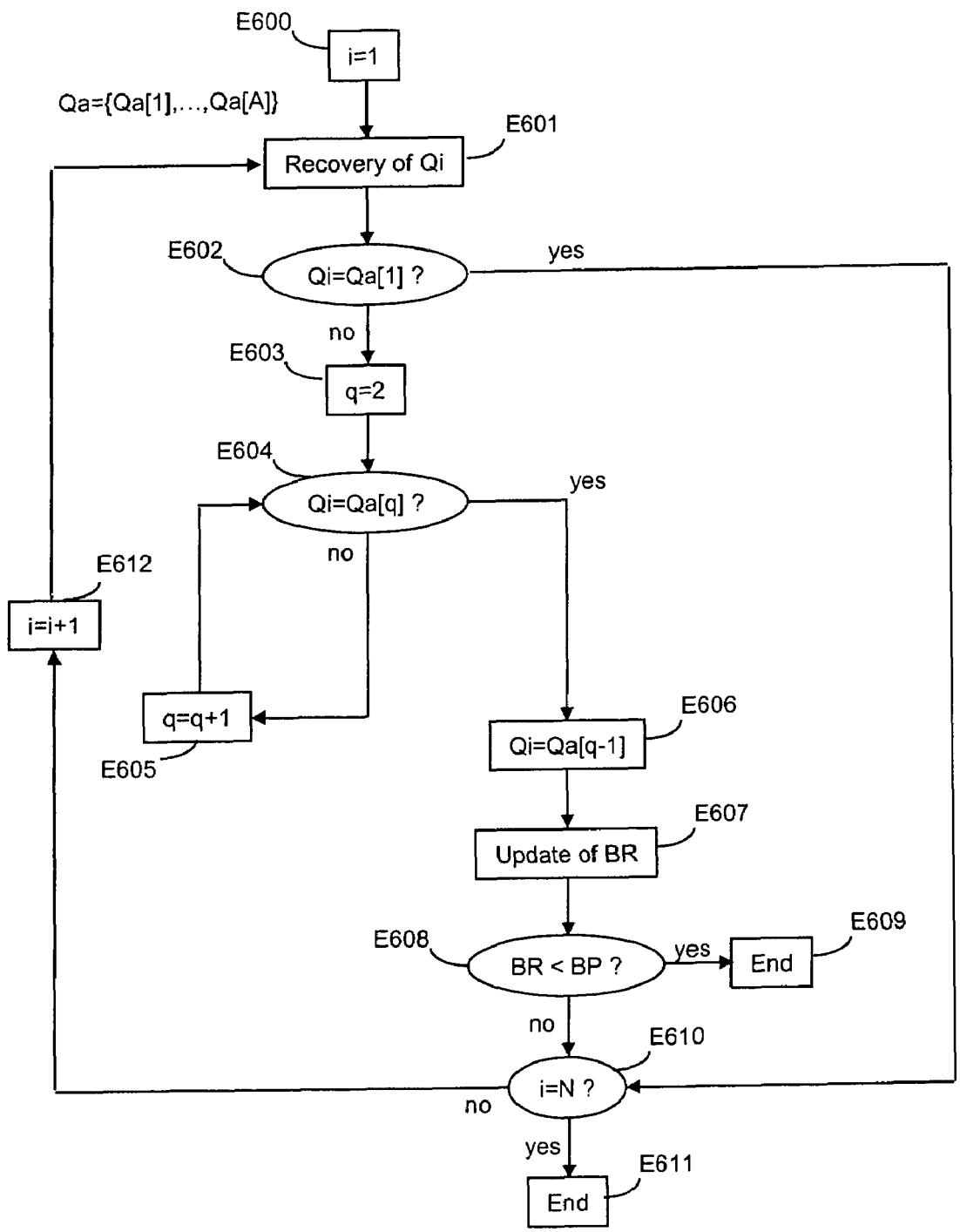
FIG. 6 illustrates the steps of the method of modifying the quality of the images of a zone according to the invention.

With reference to FIG. 6, the method of modifying the quality of the images in a group has been described.

The method begins with step E600, which initializes an image counter i. Step E601 recovers the quality Qi of the current image i. Step E601 is followed by step E602, which tests whether this quality is the minimum quality of the image. If such is the case, step E602 is followed by step E610. In the contrary case, step E602 is followed by step E603, which initializes a counter q on the qualities of the current image. Step E603 is followed by step E604, which tests whether the quality of the image is equal to the current quality Qi[q]. If such is not the case, step E604 is followed by step E605, which considers the following quality. Step E605 is followed by the previously described step E604. Where the test of step E604 is positive, this step is followed by step E606, which reduces the quality of the current image i. For this purpose, the image is replaced with the image with the new quality (degraded image). Step E606 is followed by step E607, which recalculates the size of the new document. Step E607 is followed by step E608, which tests whether the size of this new document is less than the maximum size fixed by the user. If the result of the test is positive, the process of modifying the quality of the images in this group stops (E609). In the contrary case, step E608 is followed by step E610, which tests whether all the images in this group have been considered. If such is the case the process stops (E611). In the contrary case, step E610 is followed by step E612, which considers another image in the group. Step E612 is followed by the previously described step E601.

Figure 7:
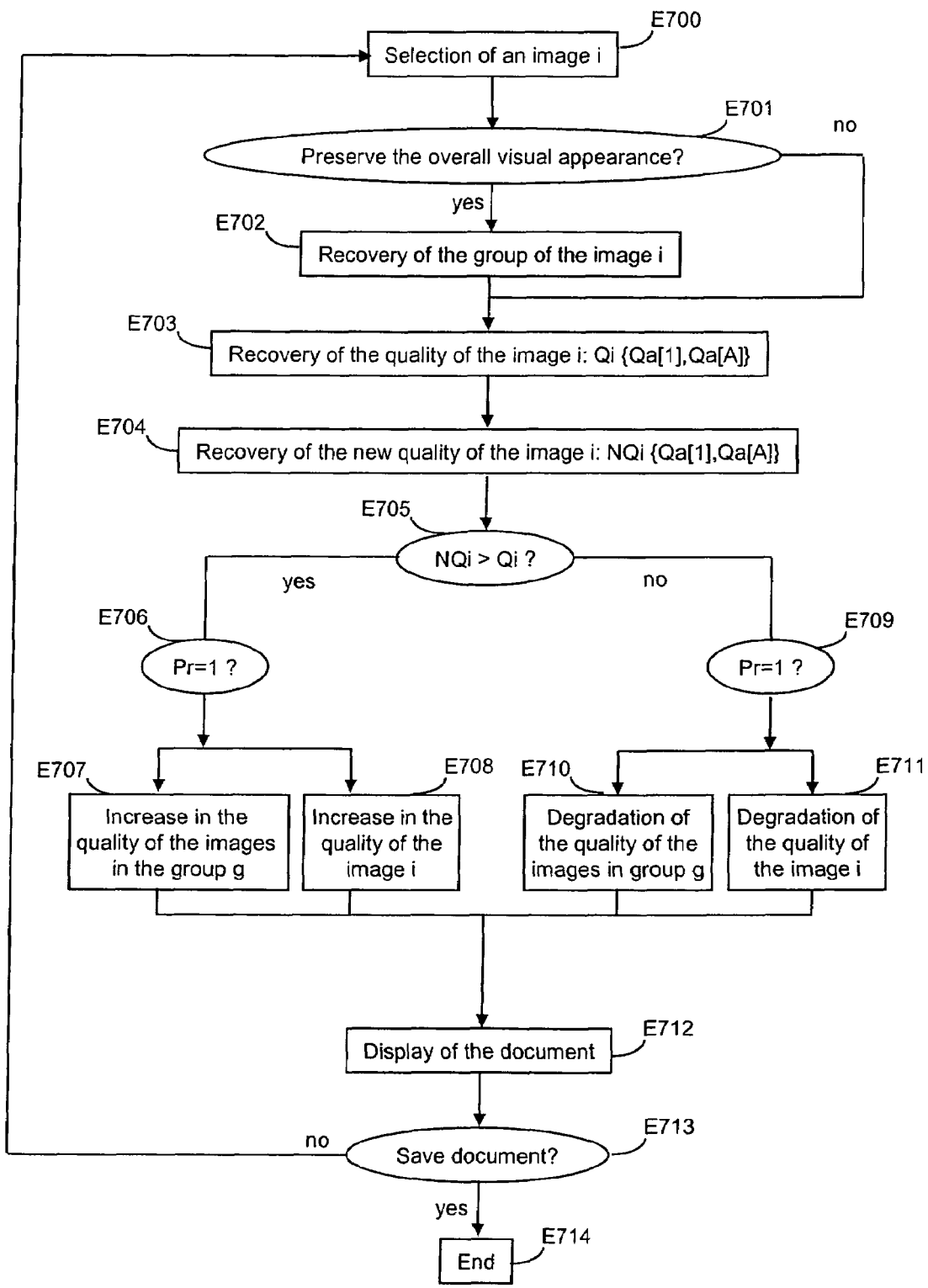
FIG. 7 illustrates the steps of the semi-automatic creation method according to the invention.

With reference to FIG. 7, the method of semi-automatic creation of a document has been described.

The document results from the automatic creation process described previously. Thus, following the display of this document, the user can consider that some images in his document are too degraded or that some of them are not sufficiently degraded. During step E700, the user selects an image in his document using a graphical means of FIG. 1. Step E700 is followed by step E701, which asks the user whether he wishes to preserve the overall appearance of the document, that is to say a modification of the quality of an image (belonging to a group) has repercussions on all the images in this group. If the test of step E701 is positive, step E702 recovers the group to which the current image i belongs. Step E702 is followed by step E703. Where the test of step E701 is negative, step E703 recovers the quality of the current image. During step E704, the user specifies the new quality NQi of the image selected. Step E704 is followed by step E705, which tests whether the new quality is greater than the quality of the current image. If such is the case, step E705 is followed by step E706, which tests whether the user wishes to preserve the overall quality. If such is the case, the quality of each image in the group is increased (step E707). If such is not the case, only the quality of the image selected is increased (E708). If the test of step E705 is negative, step E705 is followed by a step E709, which tests whether the user wishes to preserve the overall quality. If such is the case, the quality of each image in the group is decreased (step E710). If such is not the case, only the quality of the selected image is decreased (step E711).

Steps E707, E708, E710 and E711 are followed by step E712, which enables the user to display the new document. Step E712 is followed by step E713, which asks the user whether he wishes to save the document. In the affirmative, the process stops (E714). In the contrary case, step E713 is followed by the previously described step E700.

The invention claimed is:

1. A method of optimizing the size of a digital document comprising at least two digital contents, comprising the following steps:
   i) determining at least two distinct spatial zones connected to each other according to a chosen geometrical relationship;
   ii) allocating each content to a zone;
   iii) obtaining the size of the document thus composed as a number of bytes;
   iv) comparing the size of the document thus composed with a chosen size; and
   v) if the size of the document is greater than the chosen size, choosing at least one zone and modifying the quality of at least one content allocated to that zone.

2. A method according to claim 1, wherein step v) is repeated until the size of the document is equal to or less than the chosen size.

3. A method according to claim 1, wherein the modification step is implemented for all the contents allocated to the zone thus chosen.

4. A method according to claim 1, further comprising a step of selecting at least one content allocated to the zone thus chosen and in that the modification step is implemented for the content thus selected.

5. A method according to claim 1, wherein the quality of a content is determined according to at least one criterion belonging to the group formed by the size, the resolution and the number of bits per pixel.

6. A method according to claim 1, wherein the geometrical relationship is defined according to at least one law for dividing the document chosen.

7. A method according to claim 6, wherein the division law is chosen by the user.

8. A method according to claim 1, wherein each digital content comprises digital data belonging to the group formed by images, sound, sequences of images, graphics, text or a combination of digital data.

9. A method according to claim 8, wherein the digital document is of the composite type.

10. An information medium which can be read by a computer system, possibly totally or partially removable, in particular a CD-ROM or magnetic medium, such as a hard disk or a floppy disk, or a transmissible medium, such as an electrical or optical signal, characterized in that it comprises instructions of a computer program enabling an optimization method to be implemented according to claim 1, when this program is loaded into and executed by a computer system.

11. A method according to claim 1, wherein the step of obtaining the size of the document thus composed as a number of bytes comprises a step of calculating the size of the document thus composed as a function of the size expressed in bytes of the images included in the document.

12. A method according to claim 1, wherein there are associated at least two qualities with each content.

13. A device for optimizing the size of a digital document comprising at least two digital contents, comprising:
   means for determining at least two distinct spatial zones connected to each other in accordance with a chosen geometrical relationship,
   means for allocating each content to a zone,
   means for obtaining the size of the document thus composed as a number of bytes,
   means for comparing the size of the document thus composed with a chosen size, and
   means for, if the size of the document is greater than the chosen size, choosing at least one zone and modifying the quality of at least one content allocated to that zone.

14. A device according to claim 13, further comprising modification means able to modify all the contents allocated to the zone thus chosen.

15. A device according to claim 13, further comprising modification means able to modify a content thus selected.

16. A device according to claim 13, wherein the means for obtaining the size of the document thus composed as a number of bytes comprise means for calculating the size of the document thus composed as a function of the size expressed in bytes of the images included in the document.

17. A device according to claim 13, wherein there are associated at least two qualities with each content.

* * * * *